United States Patent Office 3,356,767
Patented Dec. 5, 1967

---

3,356,767
DIMETHYL TRIPHENYL PHOSPHINIMINE PHOSPHATE
Rolf Appel, Bonn, Germany, assignor to Olin Mathieson Chemical Corporation, a corporation of Virginia
No Drawing. Filed Dec. 13, 1963, Ser. No. 330,247
1 Claim. (Cl. 260—926)

ABSTRACT OF THE DISCLOSURE

Dimethyl triphenylphosphinimine phosphate having the formula $A_3P:N.PO(OCH_3)_2$ in which A is phenyl is prepared by the reaction of sodium methylate with a triphenylphosphinimine dihalophosphate having the formula $A_3P:N.POX_2$ in which X is chlorine or bromine. The product is useful as an insecticide.

---

This invention relates to a novel dimethyl triphenylphosphinimine phosphate having the formula

$$A_3P:N.PO(OCH_3)_2$$

in which A is phenyl and to a process of preparing it.

The novel compound is prepared by the reaction of sodium methylate with triphenylphosphinimine dihalophosphates of the formula $A_3P:N.POX_2$ in which X is chlorine or bromine. These starting materials are prepared as described by Appel et al., Z. anorg. allgem. Chem., 320, 3–10 (January 1963).

The proportions of triphenylphosphinimine dihalophosphate and sodium methylate are appropriately substantially stoichiometric but some excess of either, particularly of the sodium methylate can be used.

Advantageously the reaction is carried out in methanol, preferably absolute (anhydrous) methanol but the proportion is not critical. After about one hour of refluxing, the reaction is complete and the resulting dimethyl triphenylphosphinimine phosphate is recovered by evaporation of the methanol. It is suitably purified by recrystallization from water, cyclohexane or a mixture of petroleum ether and benzene. It crystallizes from water, as matted, colorless needles melting at 125° C. and from benzene and petroleum ether as prisms.

The methyl triphenylphosphinimine phosphate is useful as an insecticide.

Stoichiometric proportions require one mole of sodium methylate for each halogen atom in the dihalophosphate or two moles per mole of dihalophosphate.

EXAMPLE I

A solution of 1.97 g. (0.005 mole) of triphenylphosphinimine dichlorophosphate and 0.54 g. (0.01 mole) of sodium methylate, both dissolved in 50 ml. of absolute methanol, was refluxed for one hour. The solution was evaporated and the residue was recrystallized from water. By slow cooling the dimethyl triphenylphosphinimine phosphate is obtained as matted, colorless needles melting at 125° C.

*Analysis.*—$C_{20}H_{21}NP_2O_3$ (385.4). Calc.: 62.33 C; 5.49 H; 3.63 N; 16.08 P. Found: 62.51 C; 5.61 H; 3.59 N; 16.15 P.

Molecular weight, cryscopically in benzene, 390.

What is claimed is:
Dimethyl triphenylphosphinimine phosphate.

References Cited

UNITED STATES PATENTS

2,552,576  5/1951  Moyle _____ 260—973 XR

CHARLES B. PARKER, *Primary Examiner.*
A. H. SUTTO, *Assistant Examiner.*